(12) United States Patent
Ding (10) Patent No.: US 11,216,983 B2
(45) Date of Patent: Jan. 4, 2022

(54) DEVICE AND METHOD FOR MONITORING A PREDTERMINED ENVIRONMENT USING CAPTURED DEPTH IMAGE DATA

(71) Applicant: Chicony Electronics Co., Ltd., New Taipei (TW)

(72) Inventor: Jie-Lung Ding, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 108 days.

(21) Appl. No.: 16/579,854

(22) Filed: Sep. 24, 2019

(65) Prior Publication Data

US 2020/0302647 A1 Sep. 24, 2020

(30) Foreign Application Priority Data

Mar. 21, 2019 (TW) .................................. 108109849

(51) Int. Cl.
*G06T 7/00* (2017.01)
*G06T 7/30* (2017.01)
*G06T 7/55* (2017.01)

(52) U.S. Cl.
CPC .................. *G06T 7/97* (2017.01); *G06T 7/30* (2017.01); *G06T 7/55* (2017.01)

(58) Field of Classification Search
CPC .... G06T 7/97; G06T 7/30; G06T 7/55; G06K 9/00771; G06K 9/00201; G06K 9/00288; G08B 13/19613; G08B 25/10
See application file for complete search history.

(56) References Cited

U.S. PATENT DOCUMENTS

| 9,529,451 | B2* | 12/2016 | Lee | .................... G06K 9/00771 |
| 10,019,624 | B2* | 7/2018 | Liu | ..................... G06K 9/00228 |
| 10,635,907 | B2* | 4/2020 | Child | ........................ G07C 9/30 |
| 2019/0278976 | A1* | 9/2019 | Khadloya | ............ G06K 9/6262 |

FOREIGN PATENT DOCUMENTS

| CN | 108765675 A | 11/2018 |
| TW | M553455 U | 12/2017 |

OTHER PUBLICATIONS

Thuy et al.: "Access Control Using Face Recognition", Apr. 22, 2014, Hanoi University of Science and Technology, Journal of Science & Technology 101 (2014), pp. 159-163. (Year: 2014).*

* cited by examiner

*Primary Examiner* — John B Strege
(74) *Attorney, Agent, or Firm* — CKC & Partners Co., LLC (57) ABSTRACT

A monitoring method includes the following operations: capturing depth image data of a predetermined environment and generating estimated distance of an object in the predetermined environment; comparing the depth image data with human body feature; and controlling the depth camera to perform a recording operation when the depth image data conforms to the human body feature and when the estimated distance is less than a first distance threshold, in order to generate video data.

10 Claims, 7 Drawing Sheets

DEVICE AND METHOD FOR MONITORING A PREDTERMINED ENVIRONMENT USING CAPTURED DEPTH IMAGE DATA

CROSS-REFERENCE TO RELATED APPLICATION

This application claims priority to Taiwan Application Serial Number 108109849, filed Mar. 21, 2019, which is herein incorporated by reference in its entirety.

BACKGROUND

Technical Field

The present disclosure relates to a monitoring device and a monitoring method, and in particular to the monitoring device and the monitoring method for a depth camera.

Description of Related Art

In home security applications, the cameras are often used for environmental monitoring. However, a 2D camera cannot recognize the distance between an object and the 2D camera, and cannot judge whether the object is approaching. The image captured is affected by the shadow and the surrounding environment as well, resulting in misjudgments of recognition.

SUMMARY

An aspect of the present disclosure relates to a monitoring device. The monitoring device includes a depth camera, a memory and a processor. The depth camera is disposed in a predetermined environment and configured to capture depth image data of the predetermined environment and to generate an estimated distance of an object in the predetermined environment. The memory is configured to store a human body feature. The processor is coupled to the depth camera and the memory, and the processor is configured to perform the following operations: comparing the depth image data with the human body feature; and controlling the depth camera to perform a recording operation based on that the depth image data conforms to the human body feature and that the estimated distance is less than a first distance threshold, in order to generate video data.

An aspect of the present disclosure relates to a monitoring method, and the monitoring method includes the following operations: capturing depth image data of a predetermined environment and generating an estimated distance of an object in the predetermined environment by a depth camera; comparing the depth image data with a human body feature by a processor; and controlling the depth camera to perform a recording operation based on that the depth image data conforms to the human body feature and that the estimated distance is less than a first distance threshold by the processor, in order to generate video data.

As described above, the monitoring device and the monitoring method provided by the embodiments of the present disclosure can determine the distance between the object and the camera, and can identify whether the object is a human body. In addition, with the face recognition function, the situation of misjudgment can be reduced, and the monitoring application and home security can be improved.

DETAILED DESCRIPTION

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

It will be understood that when an element is referred to as being "on" another element, it can be directly on the other element or intervening elements may be present there between. In contrast, when an element is referred to as being "directly on" another element, there are no intervening elements present. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
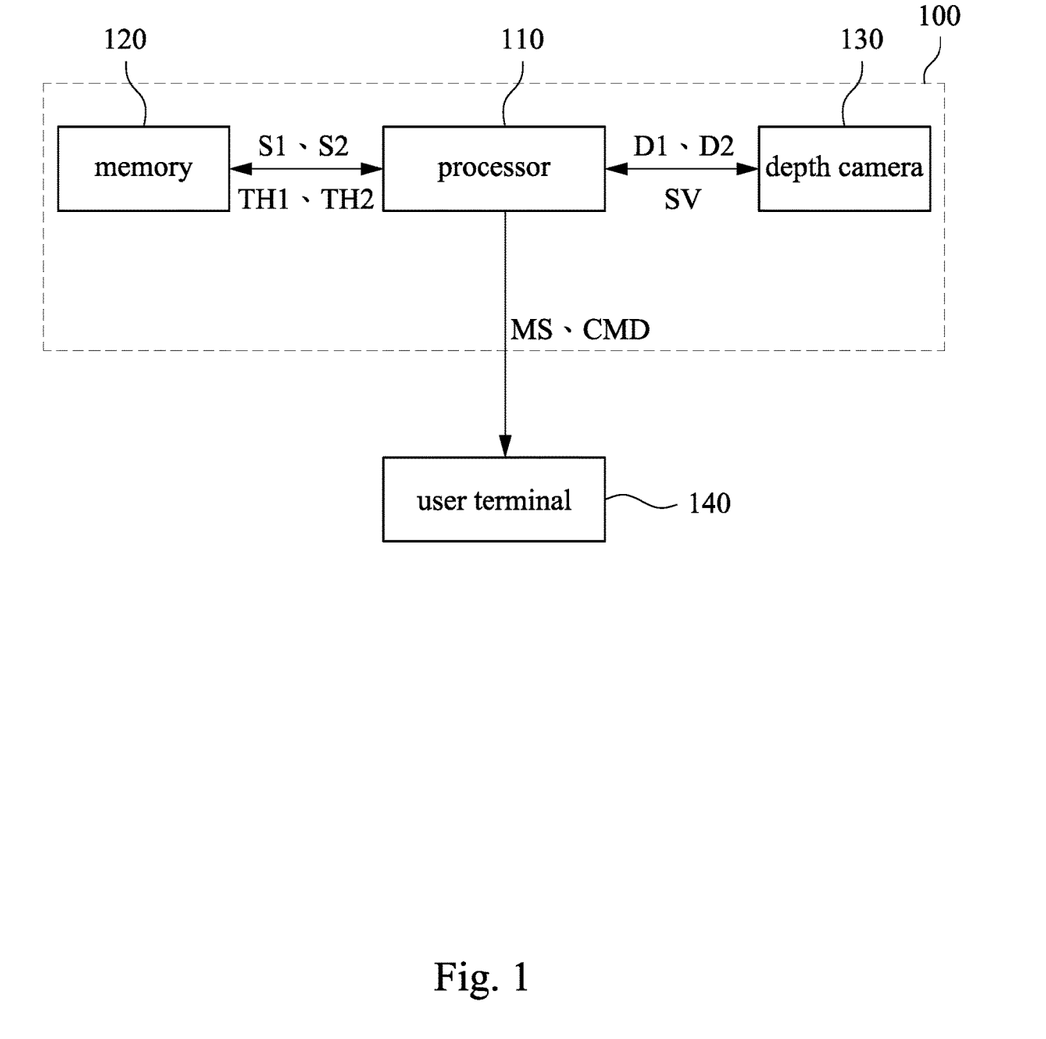
FIG. 1 shows a schematic diagram of a monitoring device according to some embodiments of the present disclosure.

Referring to FIG. 1, FIG. 1 is a schematic diagram of a monitoring device 100 according to some embodiments of the present disclosure. The monitoring device 100 can be applied to different applications, such as monitoring, video recording, home security, etc., but the present disclosure is not limited thereto.

The monitoring device 100 includes a processor 110, a memory 120 and a depth camera 130. The processor 110 is coupled to the memory 120 and the depth camera 130. In some embodiments, the processor 110 is a central processing unit (CPU), an application-specific integrated circuit (ASIC), a multi-processor, a distributed processing system, or a suitable processor, but the present disclosure is not limited thereto.

The memory 120 stores information of a human body feature S1 and a facial feature S2 that are for the monitoring device 100 to perform the human body recognition and face recognition of depth image data D1 respectively. In some embodiments, the human body feature S1 may be image data of a main part of a human body (for example, a trunk, a body contour, etc.). In some embodiments, the facial feature S2 can be a facial image data of a user of a user terminal 140 or the facial image data of any person acknowledged by the user terminal 140.

In some embodiments, the memory 120 is a non-transitory computer readable medium. In some embodiments, the computer readable medium is an electrical, magnetic, optical, infrared, and/or semiconductor system (or apparatus or device). For example, the non-transitory computer readable medium includes semiconductor or solid state memory, magnetic tape, removable computer diskettes, random access memory (RAM), read only memory (ROM), hard disk and/or optical magnetic dish. In some embodiments, the computer readable medium includes a CD-ROM, a CD-R/W, and/or a digital video disc (DVD).

The depth camera 130 is an electronic device that captures and records the depth image data D1. The depth camera 130 is configured to detect and analyze an appearance and distance information of an object 200 in a predetermined environment, in order to have three-dimensional (3D) image recognition capabilities.

In some embodiments, the depth camera 130 may be disposed in a predetermined environment (e.g., home entrance, window, etc.), in order to capture the depth image data D1 of the predetermined environment and monitor a distance between the object 200 in the predetermined environment and the monitoring device 100. The depth camera 130 further transmits the depth image data D1 of the predetermined environment and the distance data between the object 200 in the predetermined environment and the monitoring device 100 to the processor 110.

The user terminal 140 may be an electronic device owned by an owner or a user of the predetermined environment (e.g., a cell phone, a home monitoring host, etc.). The user terminal 140 is an electronic device that can transmit/receive external data or provide external services via a network. For example, when the monitoring device 100 determines that a stranger is present in the predetermined environment and is approaching, the processor 110 transmits a warning signal MS to the user terminal 140 for alerting.

In some embodiments, when the monitoring device 100 determines that the person entering the predetermined environment is an authorized user, the processor 110 transmits a permission instruction CMD to the user terminal 140. The user terminal 140 can perform a preset operation according to the permission instruction CMD (for example, sending an instruction via a home host to unlock the door) to allow the person to enter an entrance. Alternatively, in some embodiments, the processor 110 can directly control the door. When the monitoring device 100 determines that the person entering the predetermined environment is the owner or other authorized user, the processor 110 output the permission instruction CMD to directly unlock the door.

Figure 2A:
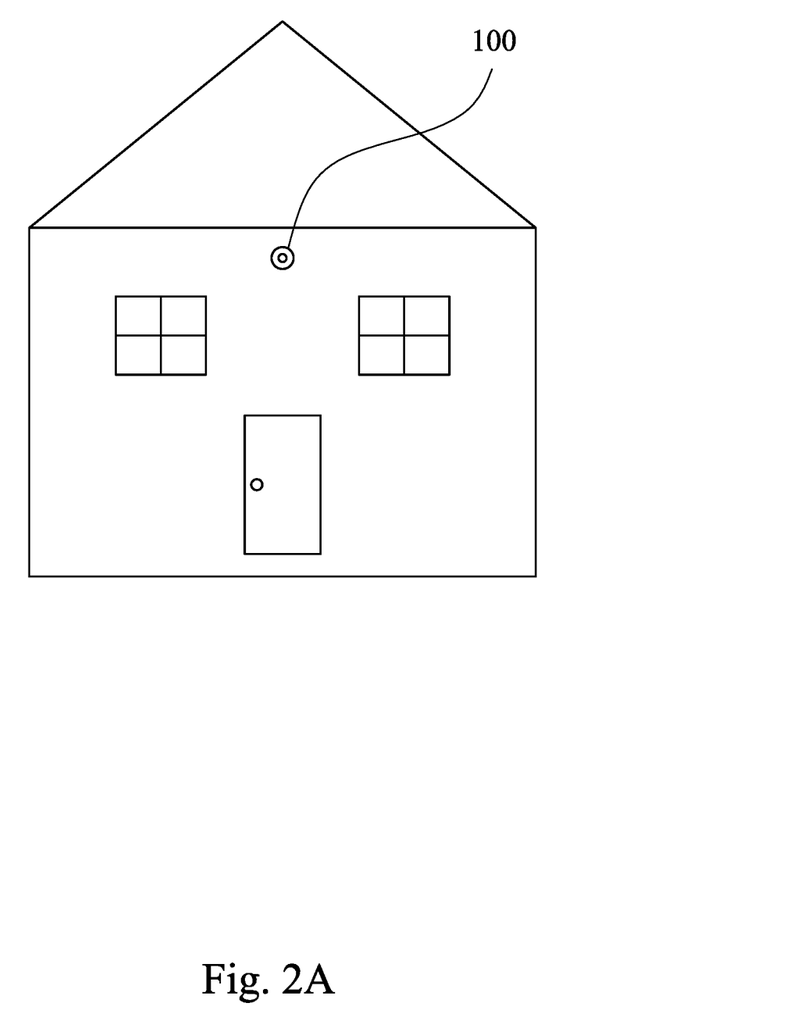
FIG. 2A shows a front view of the monitoring device of FIG. 1 according to some embodiments of the present disclosure applied to an outdoor.

FIG. 2A is a front view of the monitoring device 100 of FIG. 1 being applied to an outdoor environment according to some embodiments of the present disclosure. As mentioned above, the monitoring device 100 is configured to detect the predetermined environment, and the predetermined environment may be an environment outside the front of a house shown in FIG. 2A. As shown in FIG. 2A, the monitoring device 100 is disposed outside the house and disposed above the door to detect the distance between the object 200 passing by (and/or through) the house and the monitoring device 100, in order to improve the security of the house.

Figure 2B:
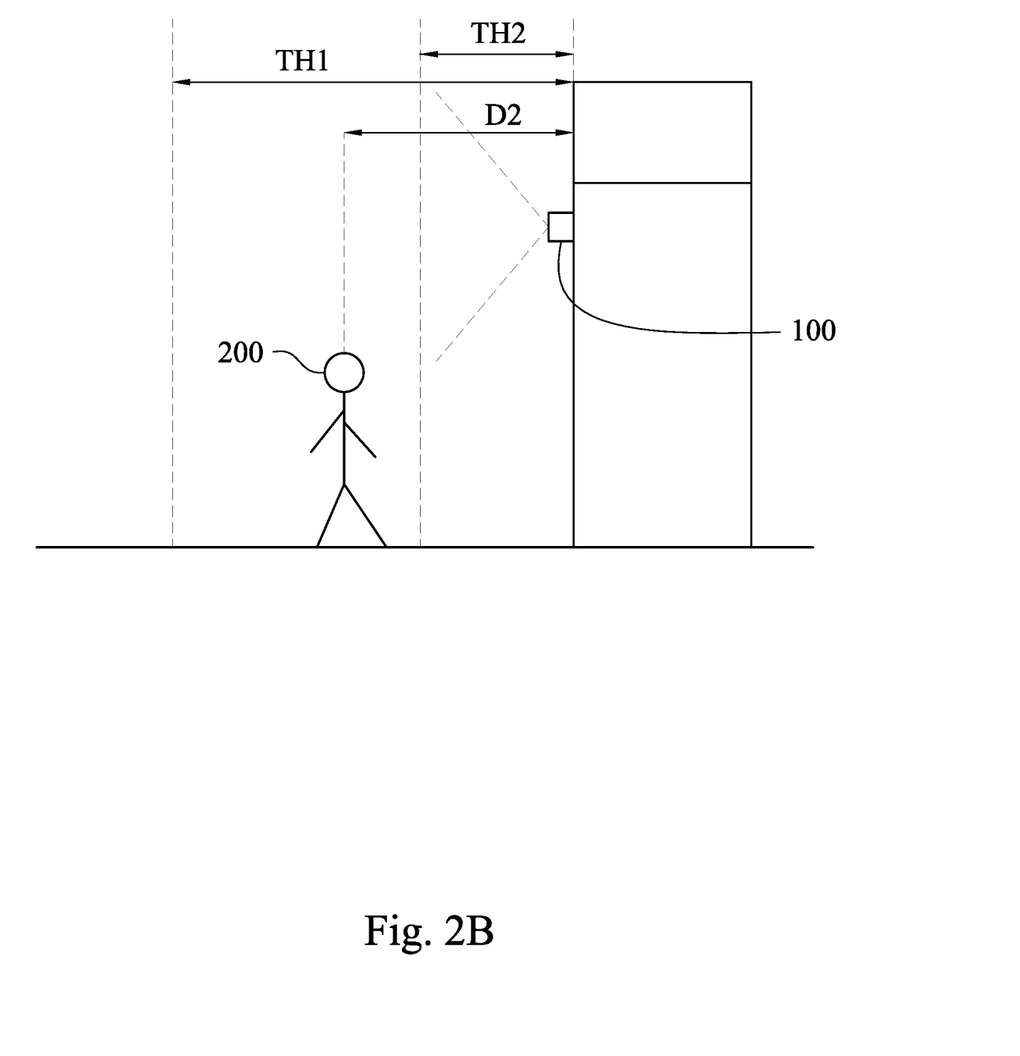
FIG. 2B shows a schematic diagram of the monitoring device, a distance threshold, and an object according to some embodiments of the present disclosure.

FIG. 2B is a schematic diagram of a monitoring device 100, a distance threshold, and the object 200 according to some embodiments of the present disclosure. FIG. 2B is a side view of FIG. 2A. For ease of understanding, reference is made to FIGS. 1 to 2B for the operation below.

As shown in FIG. 2B, the monitoring device 100 is disposed outside of the house. The position of the monitoring device 100 is at the door of the house. The memory 120 stores two distance information in advance, which includes a first distance threshold TH1 and a second distance threshold TH2. The first distance threshold TH1 is the distance between a location farther ahead of the monitoring device 100 and the monitoring device 100, and the second distance threshold TH2 is the distance between a location closer ahead of the monitoring device 100 and the monitoring device 100. Explained in another way, the first distance threshold TH1 is greater than the second distance threshold TH2.

In some embodiments, the processor 110 can control the depth camera 130 to continuously capture the depth image data D1 of the predetermined environment, in order to determine whether the object 200 is moving based on the depth image data D1. For example, the processor 110 can continuously obtain an estimated distance D2 of the object 200 based on the depth image data D1. If the estimated distance D2 changes, it indicates that the object 200 is moving. In some embodiments, based on the estimated distance D2, the processor 110 can determine whether the object 200 is moving toward a predetermined direction. For example, if the estimated distance D2 is getting shorter, it indicates that the object 200 is moving toward the position of the monitoring device 100. Alternatively, if the estimated distance D2 is getting longer, it indicates that the object 200 is moving away from the position of the monitoring device 100.

In some embodiments, when the monitoring device 100 detects the object 200 in a moving state, the processor 110 immediately compares the depth image data D1 with the human body feature S1, whereby the human body recognition of the depth image data D1 is performed by the monitoring device 100, in order to recognize whether the object 200 in the moving state is a physical person. As a result, a misjudgment of taking a shadow as an intruder can be avoided. When the depth image data D1 conforms to the human body feature S1, the processor 110 further compares the estimated distance D2 of the object 200 with the first distance threshold TH1. When the estimated distance D2 is less than the first distance threshold TH1, the processor 110 controls the depth camera 130 to perform video recording, in order to generate video data. At the same time, the processor 110 transmits the warning signal MS to the user terminal 140 for alerting.

In some embodiments, when the monitoring device 100 detects the object 200 in the moving state, the monitoring device 100 immediately calculates the estimated distance D2 between the object 200 and the monitoring device 100. If the estimated distance D2 is less than the first distance threshold TH1, the depth camera 130 captures the depth image data D1 of the predetermined environment and transmits the depth image data D1 of the predetermined environment to the processor 110. The depth image data D1 includes information of the object 200 for comparing the depth image data D1 with the human body feature S1. When the depth image data D1 conforms to the human body feature S1, the processor 110 controls the depth camera 130 to perform video recording, in order to generate the video data. At the same time, the processor 110 transmits the warning signal MS to the user terminal 140 for alerting.

In some embodiments, if the estimated distance D2 is not less than the first distance threshold TH1 (that is, the object 200 does not enter an area having a range between the first distance threshold TH1 and the house), the processor 110 controls the depth camera 130 to continuously detect the predetermined environment.

In some embodiments, if the estimated distance D2 is less than the second distance threshold TH2, the processor 110 further compares the depth image data D1 with the facial feature S2 to implement facial recognition of the depth image data D1, in order to identify whether the object 200 in the moving state is a person who is acknowledged by the user terminal 140.

In some embodiments, if the depth image data D1 conforms to the facial feature S2, the processor 110 transmits a permission instruction CMD to the user terminal 140, in order to perform the preset operation and to control the depth camera 130 to stop recording.

In some embodiments, if the depth image data D1 does not conform to the facial feature S2, the processor 110 transmits the warning signal MS to the user terminal 140, in order to alert the user terminal 140 that a foreign person is approaching the home and the facial recognition is failed.

Figure 2C:
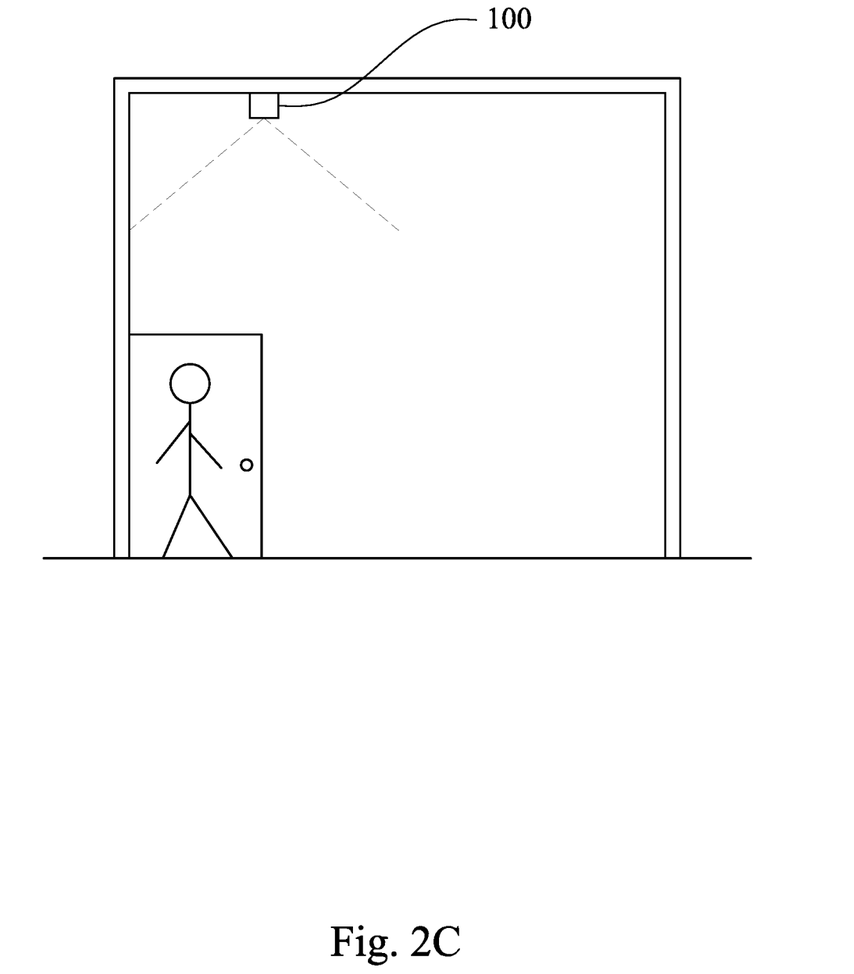
FIG. 2C shows a schematic diagram of the monitoring device applied to an interior of a room according to some embodiments of the present disclosure.

FIG. 2C is a schematic diagram of the monitoring device 100 applied to an interior of a room according to some embodiments of the present disclosure. In some embodiments, the monitoring device 100 can be disposed in an indoor of a home, in order to achieve the function of monitoring doors, windows, and personnel. For example, as shown in FIG. 2C, the monitoring device 100 can be disposed corresponding to a door inside the house (or locations like a window, a ceiling above the room, etc.), in order to detect whether an object intrudes into the house.

In some embodiments, the depth camera 130 can be implemented by approaches including, for example, Stereo Vision, Structured Light, and Time of Flight (TOF). An example in the FIG. 3 below is shown with references to the TOF approach but the present disclosure is not limited thereto.

Figure 3:
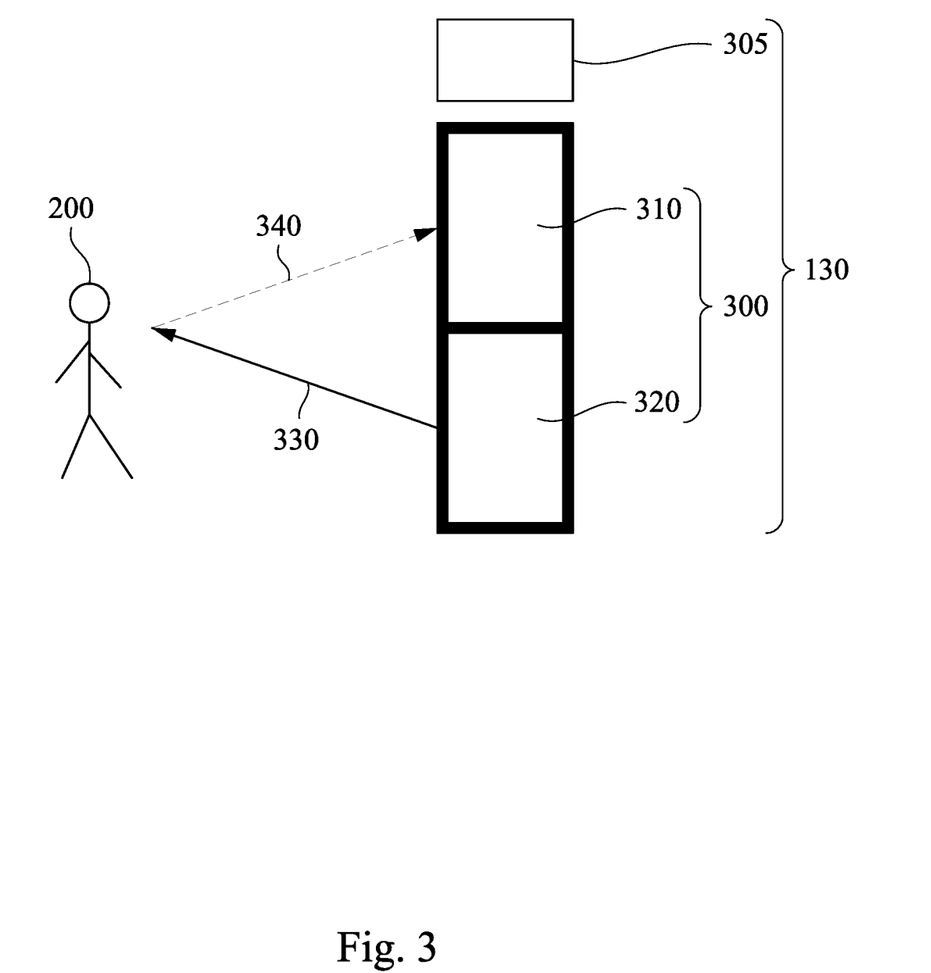
FIG. 3 shows a schematic diagram of the arrangement of a depth camera according to some embodiments of the present disclosure.

FIG. 3 is a schematic diagram of the arrangement of a depth camera 130 according to some embodiments of the present disclosure. In some embodiments, the depth camera 130 includes a proximity sensor 300 and an image capturing module 305. The proximity sensor 300 is configured to detect the estimated distance D2 of the object 200 in the predetermined environment (e.g., the estimated distance between the object 200 and the house in FIG. 2A and FIG. 2C). The image capturing module 305 is configured to capture the predetermined environment, in order to generate the depth image data D1. The image capturing module 305 is disposed adjacent to the proximity sensor 300. The image capturing module 305 may be implemented by various photosensitive elements, lens, and image processing circuit(s).

The proximity sensor 300 includes a receiver 310 and an infrared emitter 320. The infrared emitter 320 is configured to transmit a confirmation signal 330 along a direction. If the confirmation signal 330 encounters the object 200 while traveling, the object 200 will reflect the confirmation signal 330 as a reflected signal 340. When the receiver 310 receives the reflected signal 340, the receiver 310 can detect the signal strength value of the reflected signal 340 to calculate the estimated distance D2 of the object 200.

In some embodiments, if the signal strength value of the reflected signal 340 is larger, it indicates that the object 200 is closer to the monitoring device 100. Alternatively, if the signal strength value of the reflected signal 340 is smaller, it indicates that the distance between the object 200 and the monitoring device 100 is larger.

Explained in another way, in this example, the first distance threshold TH1 and the second distance threshold TH2 may respectively correspond to the first signal strength value and the second signal strength value, and the first distance threshold TH1 and the second distance threshold TH2 are stored in the memory 120. If the signal strength value of the reflected signal 340 is greater than the first signal strength value, the distance between the object 200 and the house is less than the first distance threshold TH1. Alternatively, if the signal strength value of the reflected signal 340 is greater than the second signal strength value, the distance between the object 200 and the house is less than the second distance threshold TH2.

Figure 4:
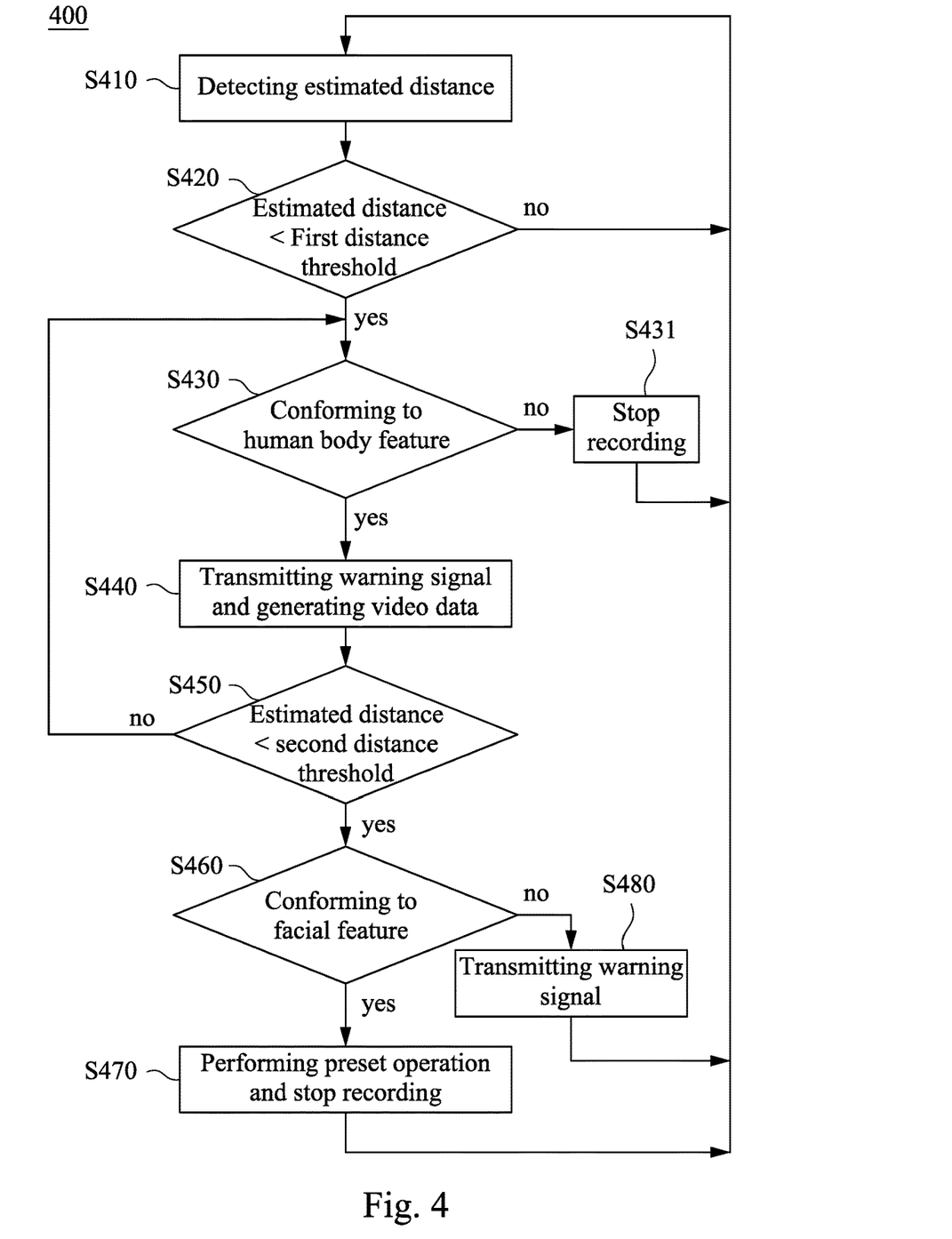
FIG. 4 shows a flow chart of a monitoring method according to some embodiments of the present disclosure.

Referring to FIG. 4, FIG. 4 is a flow chart of a monitoring method 400 according to some embodiments of the present disclosure. For ease of understanding, the monitoring method 400 is described with reference to the FIGS. 1-3. In some embodiments, the monitoring method 400 may be used for house monitoring and entry identification, in order to improve home security.

In operation S410, the estimated distance D2 is detected. As shown in FIG. 2B and FIG. 3, the monitoring device 100 can continuously detect the front environment by using the proximity sensor 300 to determine whether a moving object 200 appears. When the object 200 appears, the estimated distance D2 between the object 200 and the monitoring device 100 is calculated.

In operation S420, the estimated distance D2 is compared with the first distance threshold TH1. Based on that the estimated distance D2 is less than the first distance threshold TH1, operation S430 is performed. Alternatively, based on that the estimated distance D2 is not less than the first distance threshold TH1, operation S410 is performed.

In some embodiments, based on that the estimated distance D2 is not less than the first distance threshold TH1, the processor 110 performs operation S410 to control the depth camera 130 to continuously detect the predetermined environment.

In operation S430, the depth camera 130 transmits the depth image data D1 to the processor 110; the processor 110 compares the depth image data D1 with the human body feature S1 stored in the memory 120. Based on that the depth image data D1 conforms to the human body feature S1, operation S440 is performed. Alternatively, based on that the depth image data D1 does not conform to the human body feature S1, operation S431 is performed.

In operation S431, the processor 110 controls the depth camera 130 to stop recording, and operation S410 is performed again.

In operation S440, as the depth image data D1 conforms to the human body feature S1 and the estimated distance D2 is less than the first distance threshold TH1, the processor 110 transmits the warning signal MS to the user terminal 140 and controls the depth camera 130 to record, in order to generate the video data SV.

In some embodiments, the processor 110 transmits the warning signal MS to the user terminal 140, in order to remind the user terminal 140 that a foreign person is approaching to the home range. That is, the object 200 is a person, and the distance between the object 200 and the monitoring device 100 is less than the first distance threshold TH1.

In operation S450, the estimated distance D2 is compared with the second distance threshold TH2. In some embodiments, based on that the estimated distance D2 is less than the second distance threshold TH2, operation S460 is performed. Alternatively, based on that the estimated distance D2 is not less than the second distance threshold TH2, operation S430 is performed.

In some embodiments, if the estimated distance D2 is not less than the second distance threshold TH2, the object 200 may be away from the predetermined environment. Under this condition, the processor 110 can again determine whether the estimated distance D2 is less than the first distance threshold D1. If the estimated distance D2 is still less than the first distance threshold D1, it indicates that the object 200 is still close to the house; as a result, the processor 110 controls the depth camera 130 to continue recording. Alternatively, if the estimated distance D2 is not less than the first distance threshold D1, it indicates that the object 200 has moved away from the predetermined environment; as a result, the processor 110 controls the depth camera 130 to stop recording and operation S410 is performed.

In operation S460, the depth image data D1 is compared with the facial feature S2. Based on that the depth image data D1 conforms to the facial feature S2, operation S470 is performed. Alternatively, based on that the depth image data D1 does not conform to the facial feature S2, operation S480 is performed.

In operation S470, since the depth image data D1 conforms to the facial feature S2, it is determined that the object 200 is a person acknowledged by the user terminal 140. The processor 110 transmits the permission instruction CMD to the user terminal 140, in order to perform a preset operation. In operation S470, the processor 110 controls the depth camera 130 to stop recording, and operation S410 is performed again.

In some embodiments, the preset operation may include opening the door and window and turning on the light. For illustrative purposes, the preset operation is given with reference to applications of the home security, and the present disclosure is not limited thereto.

In operation S480, since the depth image data D1 does not conform to the facial feature S2, the processor 110 transmits the warning signal MS to the user terminal 140, in order to notify the user terminal 140 that the foreign person is approaching to the home door and that the facial recognition and unlocking fail; then operation S410 is performed again.

Figure 5:
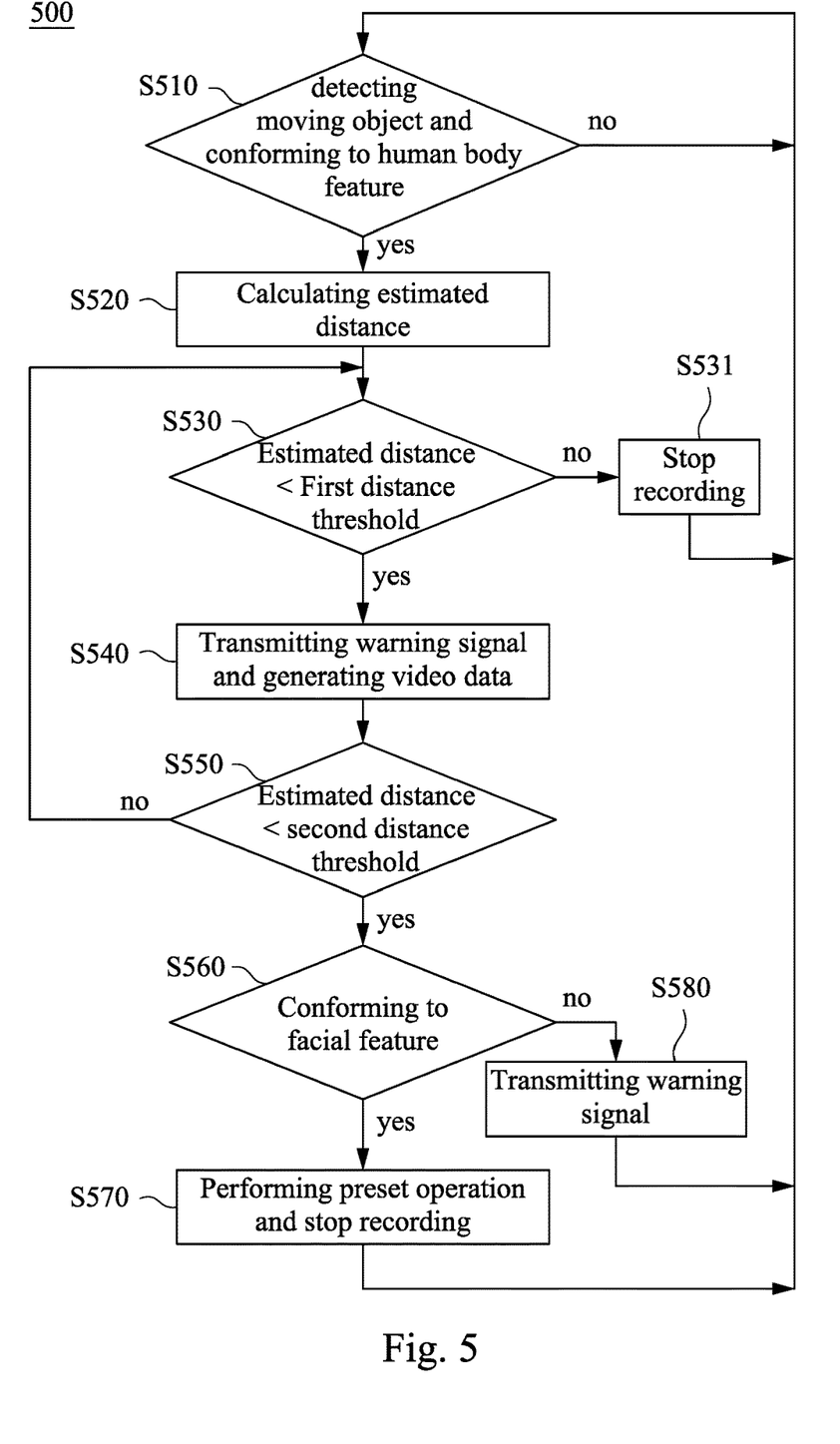
FIG. 5 shows a flow chart of the monitoring method according to some embodiments of the present disclosure.

Referring to FIG. 5, FIG. 5 is a flow chart of a monitoring method according to some embodiments of the present disclosure. For ease of understanding, the monitoring method 500 is described with reference to FIGS. 1-4. In some embodiments, the monitoring method 500 may be used for house monitoring and entry identification, in order to improve home security.

In operation S510, as shown in the FIGS. 2B and 3, the monitoring device 100 can continuously detect the front environment by using the proximity sensor 300 to determine whether a moving object is present. When the monitoring device 100 detects the object 200 in the moving state, the processor 110 immediately compares the depth image data D1 with the human body feature S1, in order to implement the human body identification of the depth image data D1 by the monitoring device 100. Accordingly, the monitoring device 100 recognizes whether the object 200 in the moving state is a physical person, and avoids the case where the shadow is mistakenly judged as an intruder. Based on that the depth image data D1 conforms to the human body feature S1, operation S520 is performed. Alternatively, based on that the depth image data D1 does not conform to the human body feature S1, the operation S510 is performed again, in order to control the depth camera 130 to continuously detect the predetermined environment.

In operation S520, the estimated distance D2 is detected. The estimated distance D2 between the object 200 and the monitoring device 100 is calculated.

In operation S530, the estimated distance D2 is compared with the first distance threshold TH1. Based on that the estimated distance D2 is less than the first distance threshold TH1, operation S540 is performed. Alternatively, based on that the estimated distance D2 is not less than the first distance threshold TH1, operation S531 is performed.

Operations S531, S540, S550, S560, S570, and S580 are similar to the operations S431, S440, S450, S460, S470, and S480 described above, and thus the details are not repeated herein. In operation S550, the estimated distance D2 is compared with the second distance threshold TH2. In some embodiments, based on that the estimated distance D2 is less than the second distance threshold TH2, operation S560 is performed. Alternatively, based on that the estimated distance D2 is not less than the second distance threshold TH2, operation S530 is performed.

The above description is given for illustrative purposes of the depth camera 130 for outdoor applications, but the present disclosure is not limited thereto. The various monitoring settings are covered by this disclosure.

In some related approaches, conventional two-dimensional cameras cannot recognize the distance of an intruder, resulting in frequent recording of images and sending of reminder signals. The two-dimensional camera also cannot recognize the difference between the shadow and the actual object, resulting in a misjudgment of identifying the object.

Compared to the above approaches, the embodiment of the present disclosure achieves three-dimensional image monitoring by using a depth camera 130 having a distance measuring function and a human body and a face recognition function. As a result, the issue of the above approaches is addressed, and thus the home security is improved.

The multiple operations in the above monitoring method 400 and monitoring method 500 are only examples. It is not limited to be performed in the order in this example. Various operations of the monitoring method may be appropriately added, replaced, omitted, or performed in a different order, without departing from the operation and scope of the embodiments of the present disclosure.

As described above, the monitoring device and the monitoring method provided by the embodiments of the present disclosure can determine the distance between the object and the camera, and can identify whether the object is a human body. In addition, with the face recognition function, the situation of misjudgment can be reduced, and the monitoring application and home security can be improved.

Although the present disclosure has been disclosed in the above embodiments, but it is not limited thereto. Anyone who is familiar with this skill can make various changes and refinements without departing from the spirit and scope of this disclosure. Therefore, the scope of protection of this disclosure is subject to the definition of the scope of the patent application attached.

What is claimed is:

1. A monitoring device, comprising:
a depth camera disposed in a predetermined environment and configured to capture depth image data of the predetermined environment and to generate an estimated distance of an object in the predetermined environment;
a memory configured to store a human body feature and a facial feature; and
a processor coupled to the depth camera and the memory and configured to perform the following operations:
comparing the estimated distance with a first distance threshold;
based on that the estimated distance is less than the first distance threshold, and
greater than a second distance threshold, comparing the depth image data with the human body feature without comparing the depth image data with the facial feature;
controlling the depth camera to continuously capture the depth image data of the predetermined environment and determining whether the object is moving;
controlling the depth camera to perform a recording operation based on that the depth image data conforms to the human body feature, the estimated distance is less than the first distance threshold, and that the object is determined to be moving in order to generate video data;
comparing the estimated distance with the second distance threshold if the estimated distance is less than the first distance threshold, wherein the first distance threshold is greater than the second distance threshold;
based on that the estimated distance is less than the second distance threshold, comparing the depth image data with the facial feature; and
outputting a permission instruction based on that the depth image data conforms to the facial feature in order to unlock a door.

2. The monitoring device of claim 1, wherein based on that the depth image data conforms to the human body feature and that the estimated distance is less than the first distance threshold, the processor sends a warning signal.

3. The monitoring device of claim 1, wherein based on that the depth image data does not conform to the facial feature, the processor sends a warning signal.

4. The monitoring device of claim 1, wherein the processor is configured to control the depth camera to continuously generate the estimated distance of the object and to determine whether the object is moving in a predetermined direction based on the estimated distance.

5. The monitoring device of claim 1, wherein the depth camera comprises:
an image capturing module configured to generate the depth image data; and
a proximity sensor configured to emit an infrared signal to detect a reflected signal generated by the object in response to the infrared signal, in order to generate the estimated distance.

6. A monitoring method, comprising: capturing depth image data of a predetermined environment and generating an estimated distance of an object in the predetermined environment by a depth camera; comparing the estimated distance with a first distance threshold; based on that the estimated distance is less than the first distance threshold, and greater than a second distance threshold, comparing the depth image data with a human body feature without comparing the depth image data with the facial feature by a processor; controlling the depth camera to continuously capture the depth image data of the predetermined environment and determining whether the object is moving; controlling the depth camera to perform a recording operation based on that the depth image data conforms to the human body feature, the estimated distance is less than the first distance threshold, and that the object is determined to be moving by the processor, in order to generate video data; comparing the estimated distance with the second distance threshold if the estimated distance is less than the first distance threshold, wherein the first distance threshold is greater than the second distance threshold; based on that the estimated distance is less than the second distance threshold, comparing the depth image data with a facial feature; and outputting a permission instruction based on that the depth image data conforms to the facial feature in order to unlock a door.

7. The monitoring method of claim 6, further comprising:
based on that the depth image data conforms to the human body feature and that the estimated distance is less than the first distance threshold, sending a warning signal by the processor.

8. The monitoring method of claim 7, wherein further comprising:
sending a warning signal by the processor based on that the depth image data does not conform to the facial feature.

9. The monitoring method of claim 8, further comprising:
controlling the depth camera to continuously generate the estimated distance of the object by the processor; and
determining whether the object is moving in a predetermined direction based on the estimated distance by the processor.

10. The monitoring method of claim 8, wherein the depth camera comprises an image capturing module and a proximity sensor, and capturing the depth image data and generating the estimated distance comprises:
generating the depth image data by the image capturing module; and
emitting an infrared signal to detect a reflected signal which is generated by the object in response to the infrared signal, by the distance sensor in order to generate the estimated distance.

* * * * *